(12) United States Patent
Arslan

(10) Patent No.: US 9,388,918 B2
(45) Date of Patent: Jul. 12, 2016

(54) PIPELINE BURIAL IN OFFSHORE AND ARCTIC OFFSHORE REGIONS

(71) Applicant: Haydar Arslan, Spring, TX (US)

(72) Inventor: Haydar Arslan, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 48 days.

(21) Appl. No.: 14/321,610

(22) Filed: Jul. 1, 2014

(65) Prior Publication Data

US 2015/0056019 A1 Feb. 26, 2015

Related U.S. Application Data

(60) Provisional application No. 61/869,383, filed on Aug. 23, 2013.

(51) Int. Cl.
| | |
|---|---|
| *F16L 1/16* | (2006.01) |
| *E02F 5/10* | (2006.01) |
| *E02F 5/14* | (2006.01) |
| *B63B 21/27* | (2006.01) |

(52) U.S. Cl.
CPC . *F16L 1/16* (2013.01); *B63B 21/27* (2013.01); *E02F 5/103* (2013.01); *E02F 5/107* (2013.01); *E02F 5/108* (2013.01); *E02F 5/145* (2013.01)

(58) Field of Classification Search
CPC ............. F16L 1/16; E02F 5/103; E02F 5/107; E02F 5/108; E02F 5/145; B63B 21/27
USPC .................. 405/159, 164, 180, 182
See application file for complete search history.

(56) References Cited

U.S. PATENT DOCUMENTS

| | | | | |
|---|---|---|---|---|
| 3,256,695 A | * | 6/1966 | Bodine, Jr. .............. | E02F 5/10 172/40 |
| 3,338,060 A | | 8/1967 | Harmstorf | |
| 3,788,085 A | | 1/1974 | Holberg | |
| 3,822,558 A | * | 7/1974 | Blankenship ............ | E02F 5/08 180/116 |
| 4,069,679 A | | 1/1978 | Manley, Jr. | |
| 4,091,629 A | | 5/1978 | Gunn et al. | |
| 4,384,415 A | | 5/1983 | Brown et al. | |
| 4,432,671 A | * | 2/1984 | Westra ................... | B63B 21/27 114/296 |
| 4,759,138 A | | 7/1988 | Grinsted | |
| 4,986,697 A | | 1/1991 | Lynch | |
| 6,022,173 A | * | 2/2000 | Saxon ...................... | E02F 5/08 37/337 |
| 6,125,560 A | * | 10/2000 | Beaumont ............... | E02F 5/003 37/307 |

(Continued)

FOREIGN PATENT DOCUMENTS

| | | | | |
|---|---|---|---|---|
| EP | 0 543 467 | | 5/1993 | |
| GB | 2355276 | * | 4/2001 | ............... E02F 5/10 |
| WO | WO 8600656 A1 | * | 1/1986 | ............... E02F 5/103 |

*Primary Examiner* — Matthew R Buck
(74) *Attorney, Agent, or Firm* — ExxonMobil Upstream Research Company Law Dept.

(57) ABSTRACT

An apparatus including: a tubular suction pile; an indenter housing that surrounds the tubular suction pile, wherein the indenter housing is configured to: (a) be sunk into a seabed in response to a negative pressure created from water being removed from the tubular suction pile, and the indenter housing is configured to create a trench in the seabed; and comprise a water jetting device, within the indenter housing, that includes a first valve, a nozzle, and a channel that connects the first valve to the nozzle; and/or (b) impart a longitudinal vibration to the indenter housing and the indenter housing is configured to be sunk into a seabed in response to longitudinal vibration, and the indenter housing is configured to create a trench in the seabed.

20 Claims, 4 Drawing Sheets

(56) References Cited

U.S. PATENT DOCUMENTS

| | | | |
|---|---|---|---|
| 6,374,519 B1 * | 4/2002 | Beaumont | E02F 3/88 37/307 |
| 6,517,287 B2 * | 2/2003 | Zaiger | E02F 5/28 210/747.4 |
| 6,821,054 B2 | 11/2004 | Ballard | |
| 6,837,653 B1 | 1/2005 | Grinsted | |
| 7,621,059 B2 * | 11/2009 | McCoy, Jr. | E02F 3/905 114/296 |
| 7,918,287 B2 * | 4/2011 | Foley | E21B 25/18 175/20 |
| 8,899,877 B2 * | 12/2014 | Lazzarin | E02F 5/04 405/159 |
| 2010/0139130 A1 * | 6/2010 | Wagenaar | B63C 11/52 37/342 |

* cited by examiner the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

PIPELINE BURIAL IN OFFSHORE AND ARCTIC OFFSHORE REGIONS

CROSS REFERENCE TO RELATED APPLICATIONS

This application claims the benefit of U.S. Provisional No. 61/869,383, filed Aug. 23, 2013, which is incorporated herein in its entirety for all purposes.

TECHNOLOGICAL FIELD

The present disclosure describes trenching and pipe burial techniques that can be used in offshore and arctic offshore regions.

BACKGROUND

Development of offshore and offshore arctic pipelines requires consideration of unique design challenges such as seafloor scour/erosion and gouging by ice features. There are several types of ice features that may produce scouring of the seafloor, including icebergs, first year ice ridge keels and multiyear ridge keels. Ice is continuously drifting due to the action of environmental loads (e.g. wind and ocean currents) and may produce seabed scouring whenever water depth becomes lower than ice draft. FIG. 1 shows a schematic representation of an ice gouging process.

SUMMARY

An apparatus including: a tubular suction pile; an indenter housing that surrounds the tubular suction pile, wherein the indenter housing is configured to be sunk into a seabed in response to a negative pressure created from water being removed from the tubular suction pile, and the indenter housing is configured to create a trench in the seabed; and a water jetting device, within the indenter housing, that includes a first valve, a nozzle, and a channel that connects the first valve to the nozzle.

An apparatus including: a vibration device; and an indenter housing that surrounds the vibration device, wherein the vibration device is configured to impart a longitudinal vibration to the indenter housing and the indenter housing is configured to be sunk into a seabed in response to longitudinal vibration, and the indenter housing is configured to create a trench in the seabed.

A method including: lowering or dropping an indenter into a body of water, wherein the indenter includes a tubular suction pile, a housing that surrounds the tubular suction pile, and a water jetting device, within the housing, that includes a first valve, a nozzle, and a channel that connects the first valve to the nozzle; after the indenter comes to rest at a bottom of the seabed, sinking the indenter into the seabed, the sinking including creating a negative pressure by removing water from the tubular suction pile, wherein the negative pressure causes the indenter to sink to a predetermined depth in the sea bed; causing water to exit from the indenter, the water loosening soil in the seabed; and creating a trench in the seabed by pulling or pushing the indenter after the indenter is sunk into the seabed and the soil is loosened by the water.

A method including: lowering or dropping an indenter into a body of water, wherein the indenter includes a vibration device, and a housing that surrounds the vibration device; causing the vibration device to impart a longitudinal vibration to the housing, said longitudinal vibration causing the housing to sink to a predetermined depth in a seabed; and creating a trench in the seabed by pulling or pushing the indenter after the indenter is sunk into the seabed.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Non-limiting examples of the present technological advancement are described herein. The invention is not limited to the specific examples described below, but rather, it includes all alternatives, modifications, and equivalents falling within the true spirit and scope of the appended claims.

Figure 2:
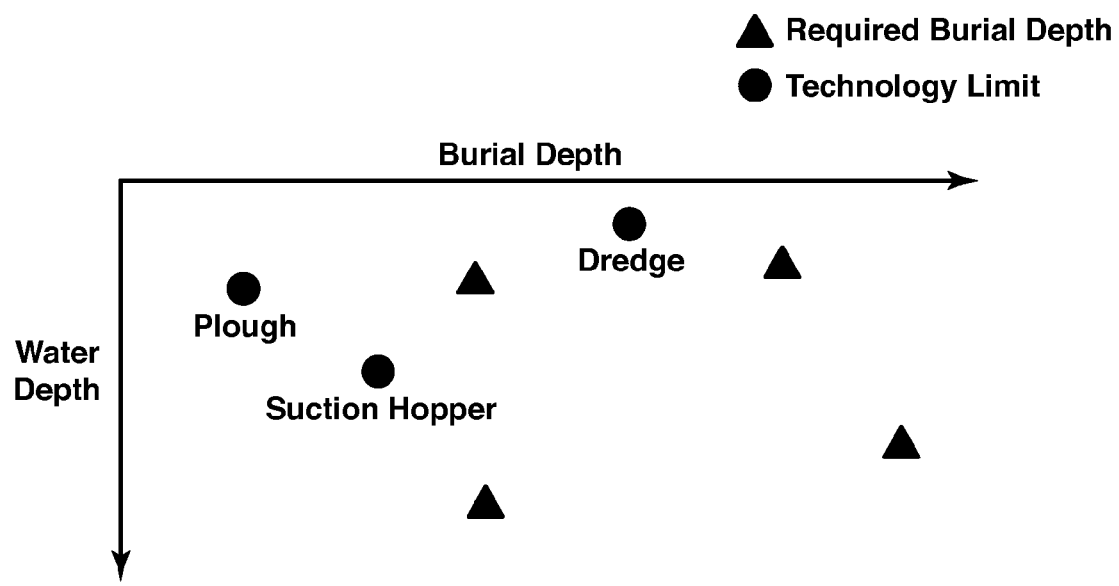
FIG. 2 illustrates some limitations of high cost trenching techniques.

Technology that can be used for pipe burial includes dredging, plough, suction hopper, and horizontal drilling. These pipe burial techniques may not satisfy design requirements at some locations, may incur high construction costs, and may produce an unwanted environmental impact. FIG. 2 illustrates some limitations the use of plough, suction hopper, and dredging techniques encounter based on burial depth of the pipe and water depth for the area in which burial is to occur.

Ploughs provide a cost-effective solution to subsea trenching, requiring basic instrumentation and little or no mechanical tooling. Generally, ploughs can operate in soils up to 400 kPa shear strength and create trench depths ranging from 1-3 meters below the seabed using single or multiple passes.

Water jetting systems (or jetters) use pumps to direct high-pressure water streams from nozzles that disperse or fluidize seabed sediments and remove obstructions like small rocks and compact soils. Nozzle, as used herein, can refer to a device designed to control a direction and/or characteristics of a fluid flow, or can be and of a pipe or tube through which fluid exits. Jetters are usually deployed directly from a support vessel or are integrated as part of a remotely operated vehicle (ROV). Water jetting offers a solution to trenching in strong, cohesive soils in the strength range of 0-500 kPa. In general, water jetters can trench to depths ranging from 1-3 meters below the seabed, depending on soil type. Jetters can be an excavation and trenching tool for seabed profiles that feature valleys and pits, or where remedial work is required to reduce free spanning of pipelines. Jetters are generally capable of operating in shallow to very deep water.

Figure 1:
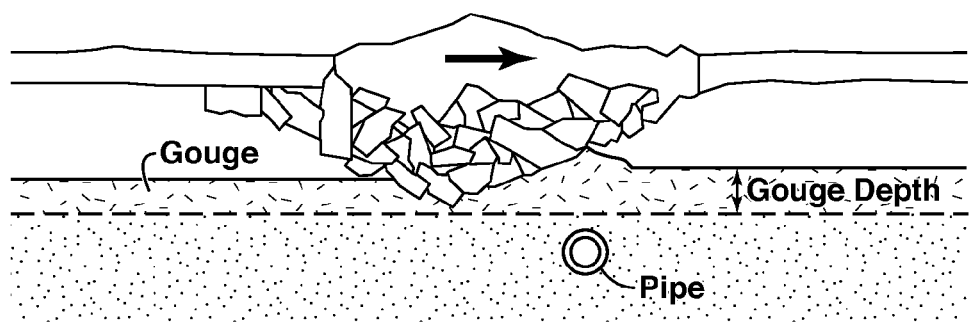
FIG. 1 is an example of a schematic representation of an ice gouging process.

By way of example, the present technological advancement can trench and bury pipelines, flowlines, and umbilicals to protect against the effects of ice scouring as depicted in FIG. 1. If a deep burial is needed (because of scouring, seabed erosion, or environmental reasons), the present technological advancement can be used in any offshore region. The present technological advancement can be configured to trench to depths greater than current industry norms (i.e., burial depths greater than three meters), and install/lay pipeline in that trench. In addition, the present technological advancement can open trenching for offshore structures other than pipeline.

Figure 3:
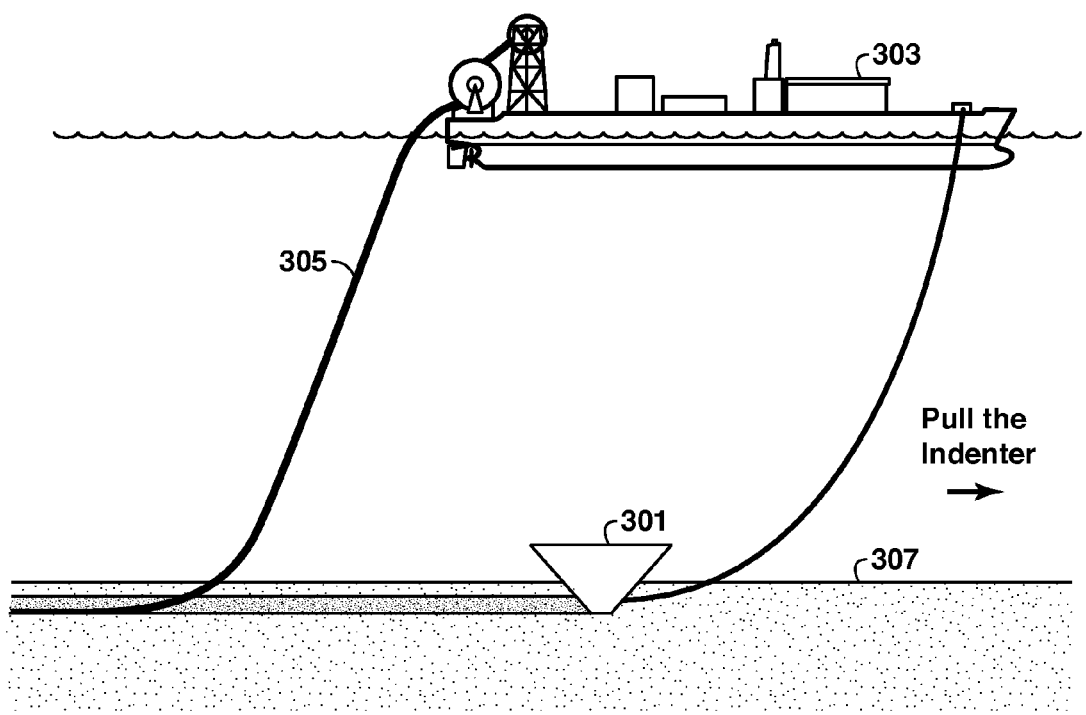
FIG. 3 illustrates an exemplary system for pipeline installation.

FIG. 3 illustrates a non-limiting example of the present technological advancement. In FIG. 3, indenter 301 is penetrated to a desired depth in the seabed 307. An indenter is a device that is designed to create a trench in a seabed. Pipeline lay barge 303 can pull indenter 301 in order to gouge the seabed 307 for trenching. Pipeline 305 may be laid on the seabed using conventional techniques (i.e., S-lay, J-lay, etc.).

While a barge is depicted, any type of above-water or below-water vessel or below water tractor may be used to pull or push the indenter.

Seabed or sea floor, as used herein, refers to any underwater bottom surface where pipe can be laid including, for example, ocean bottoms, lake bottoms, river bottoms, or canal bottoms. Pipeline 305 can included, but is not limited to, oil and gas transportation pipes, communications cabling, sewage and water pipes, and other utility transportation pipes.

Figure 4A:
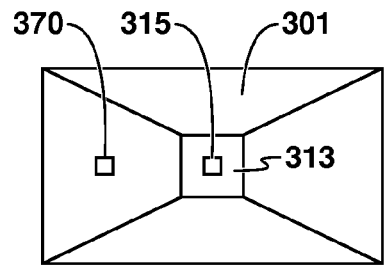
FIG. 4A is a plan view of an exemplary suction pile/jetting indenter.
Figure 4B:
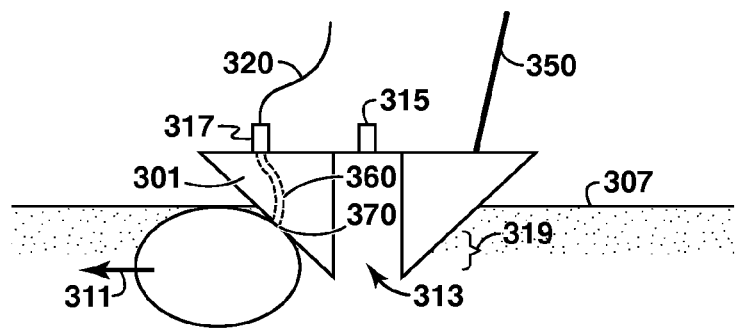
FIG. 4B is a side view of an exemplary suction pile/jetting indenter.

FIGS. 4A and 4B illustrate further details of indenter 301, with FIG. 4A illustrating a plan view and FIG. 4B illustrating a side view.

Indenter 301 can have a housing, frame, or body constructed from high strength steel. However, other materials can be used, and a person of ordinary skill in the art could select an appropriate material in order to provide sufficient strength and durability based on sand/soil conditions in which a trench will be formed. By way of example, the indenter may weigh on the order of a couple of tons, but dimensions, size, and weight would depend upon desired trench depth and soil type.

Housing or indenter housing, as used herein, is synonymous with frame and body. The housing of the indenter 301 in FIG. 4B has a wedge shape (broad and truncate at the summit, and tapering down to the base) with a trapezoidal cross-section, but other cross-sectional shapes are possible. The trapezoidal shape provides a bottom region 319 that is configured to penetrate into the seafloor when the indenter impacts the seafloor after being dropped/lowered into the body of water. Bottom region 319 can be configured to have an edge that facilitates an initial penetration of the lower region 319 into the seafloor. For example, the bottom region 319, which will make contact with the seabed 307, can have a pointed or sharpened cutting edge.

The indenter 301 is shown with a symmetrical shape, but symmetry is not required. The leading edge of the indenter 301 (the edge in the pulling direction) does not need to have the same shape as the trailing edge of the indenter 301.

The housing, frame or body of indenter 301 can be welded or otherwise directly/indirectly affixed to encompass or surround at least one suction pile 313. The at least one suction pile 313 extends into and forms at least part of the bottom region 319. The at least one suction pile 313 can include a tubular pile configured to be driven into the seabed (or more commonly dropped a few meters into a soft seabed). Then a pump, which can be included on the barge shown in FIG. 3, is configured to suck water out of the at least one tubular pile via valve 315, which causes the indenter to be sunk further down into the seabed. However, the pump need not necessarily be located on the barge, and can be located any place as long as the pump is configured to remove water out of the at least one tubular pile. A pump can be connected to the suction pile via a releasable coupling which is configured to be remotely controlled by a computer. A pump can be included within indenter 301.

Using a suction pile for a moveable structure goes against conventional wisdom. Conventional suction piles are used as a deep foundation element to support or moor offshore structures and are driven to depths of 30 meters or more. Conventional suction piles are used to prevent structures from moving, whereas the indenter disclosed herein is moveable and dragged by a barge when laying pipeline.

In the example shown in FIGS. 4A and 4B, the at least one suction pile 313 is centrally located in a body of the indenter 301. The bottom of suction pile 313 is at least partially open so that water is contained within suction pile 313 when the indenter 301 comes to rest at the seafloor. The bottom region 319 is configured to form a water tight seal with the seabed 307 when a part of the bottom region penetrates into the seabed 307. Water tight does not mean that absolutely no water may enter the suction pile. Rather, the seal is sufficiently water tight if water can be pumped out of suction pile 313 via a pump, which is connected to a valve on a closed upper end of the suction pile, in order to sink the indenter to a desired depth due to the creation of negative pressure. Removal of the water from the suction pile 313 creates a negative pressure zone that drives the indenter 301 further into the seabed 307 until the upper surface of the indenter is about even with the seabed. Sinking the indenter into the seabed by using the suction pile can provide the indenter with a penetration depth greater than three meters.

The depth of penetration of the indenter 301 can be controlled by controlling the negative pressure. Once the indenter achieves the desired depth, which may be confirmed by cameras, divers, or sensors (i.e., an echo-sounder), the pumping may be ceased and the valve 315 closed.

The at least one suction pile 313 may include several suction piles closely arranged or separated from each other by a predetermined distance. The at least one suction pile 313 does not necessarily need to be disposed at a center of the indenter 301 and a suction pile may be disposed at one or more locations so long as the one or more suction piles are disposed where they can bury the indenter into the seabed 307 as discussed above.

FIG. 4A shows that the upper surface of the indenter has a rectangular shape. However, a rectangular perimeter is not required and other perimeter shapes are possible. FIG. 4A shows that the at least one suction pile 313 has a square shape along a bottom surface. The square-cross section is merely an example and other cross-sectional shapes are possible (i.e., rectangular and circular cross-sections).

FIG. 4B illustrates an example that combines suction pile 313 and water jetting 311. Water jetting can be used to loosen/reduce the strength of the soil surrounding the indenter when the indenter is sunk into the seabed. Indenter 301, with the suction pile 313 and water jetting 311, synergistically combine to enable a target penetration depth for pipe burial (via suction pile) to be achieved while loosening the soil with water jetting to enable easier pulling of the indenter 301.

The water jetting may be facilitated by pumps that force water through jets in the pulling direction. Such a pump may be included in or on the indenter 301, or at a remote location, such as the barge 303. Alternatively, a simpler arrangement may be used, where a pump is not used to generate the water jetting. The leading portion of the indenter 301 (the portion on the pulling direction) can include a channel 360 connected to a valve 317 on the upper end of indenter 301 and a one-way jet or a one-way nozzle 370 on a tapering side of the indenter 301, with the channel extending from the top of the indenter. The valve can be opened to allow a rush of water to pass through the channel, and to exit through the one-way-jet or one-way nozzle as a stream of water that loosens the soil surrounding the leading edge of the indenter 301. Loosening the soil around the leading edge can facilitate easier pulling of the indenter 301. The valve can be connected to a hose 320 with an end open to the surrounding water, connected to the barge, or connected to pump.

Element 350 is a cable that connects indenter 301 to a computer that is programmed to control valves, pumps, sensors, and/or other equipment that are disposed in or on the indenter 301. The computer can control the pump in order to sink the indenter to a desired depth. The computer can terminate operation of the pump based on feedback from a user, a camera and/or sensors.

Indenter 301 provides many advantages when compared to the techniques discussed with respect to FIG. 2. These advantages include, but are not necessarily limited thereto: deeper burial depth, longer trench opening in a shorter time, and no requirement for special plough equipment. A single-step pipeline installation after trenching process also improves the portability of the process over other composite-type liners.

Figure 5A:
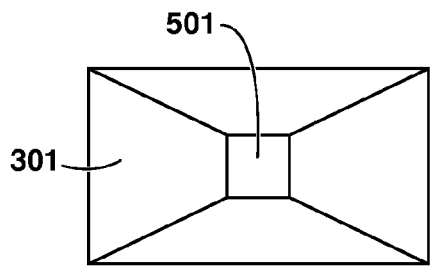
FIG. 5A is a plan view of an exemplary vibrating indenter.
Figure 5B:
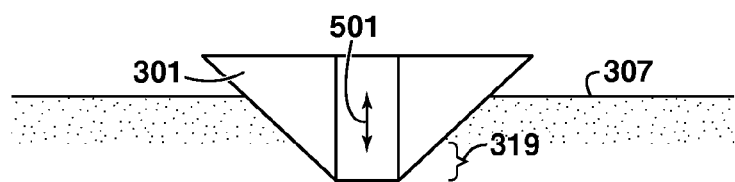
FIG. 5B is a side view of an exemplary vibrating indenter.

FIGS. 5A and 5B illustrate another exemplary indenter 301. Elements that are the same as those discussed with respect to FIGS. 4A and 4B are numbered the same and are not further discussed with respect to FIGS. 5A and 5B.

In FIGS. 5A and 5B, the suction pile has been replaced with vibration device 501. The vibration device 501 is configured to induce a vibration in a direction substantially perpendicular to the seabed as indicated by the double-headed arrow in FIG. 5B. Vibratory driving is a technique that drives the indenter 301 into the ground by imparting to the indenter 301 a small longitudinal vibratory motion of a predetermined frequency and displacement amplitude from a driving unit. The vibration device or driving unit 501 can be a hydraulic system that is at least partially incorporated into the indenter. The vibration device can be of type used for concrete vibrating machines or vibratory hammers used for pile installations.

The vibrations serve to reduce the ground resistance, allowing penetration under the action of a relatively small surcharge. Vibratory driving will achieve a target penetration depth in excess of three meters and will loosen the soil through vibration for easier pulling of the indenter. The vibrations can be maintained while the barge pulls the indenter.

A computer can control the vibration device in order to sink the indenter to a desired depth. The computer can terminate operation of the vibration device based on feedback from a user, a camera and/or sensors.

It is possible that the vibration device in FIGS. 5A and 5B can be combined with the indenter of FIGS. 4A and 4B. The driving unit that imparts the longitudinal vibratory motion may be fitted into or on an outside surface of the indenter 301. The combination of the vibratory motion and negative pressure created with the suction pile can be used to sink an indenter into the seabed. Moreover, the vibratory motion can be maintained while the indenter is pulled by the barge in order to loosen soil as the indenter is pulled through the seabed.

The proposed designs in FIGS. 4A, 4B, 5A, and/or 5B provide many advantages, which can include but are not limited thereto, deeper burial depth, creation of longer trench openings in a shorter time, and elimination of a need for specialized plough equipment. The proposed designs in FIGS. 4A, 4B, 5A, and 5B are more economical than conventional trenching techniques.

Figure 6:
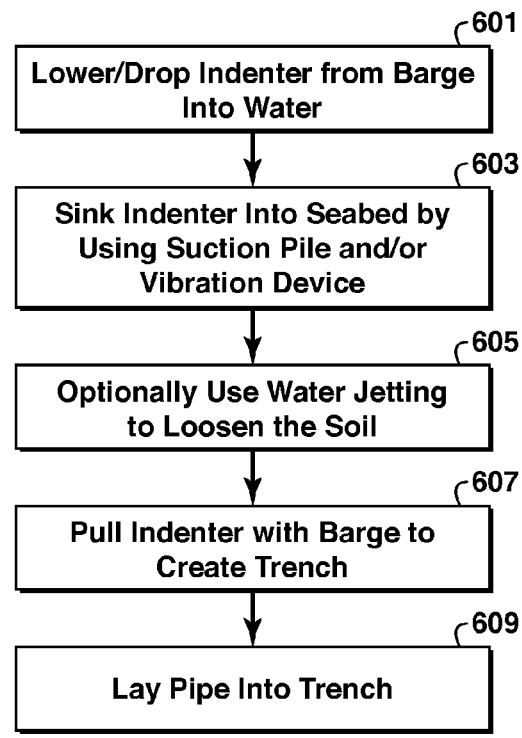
FIG. 6 is flow chart of an exemplary method for installing a pipeline.

FIG. 6 illustrates an exemplary method of installing a pipeline. In step 601, an indenter discussed above with respect to FIGS. 4A, 4B, 5A, and/or 5B is lowered or dropped into a body of water from a barge. The indenter will come to rest at the bottom of the seabed. The tapered bottom region of the indenter will sink into the seabed based on the force of impact between the seabed and the indenter. In step 603, the indenter will be further sunk into the seabed by the creation of negative pressure with a suction pile and/or imparting a longitudinal vibratory motion that drives the indenter into the seabed until the indenter reaches a desired depth. In step 605, which is optional, water jetting can be used to loosen the soil in a pulling direction. In step 607, the barge pulls the indenter in order to form a trench in the sea bed. In step 609, pipe is laid into the trench. A single-step pipeline installation after the trenching can improve the portability of the process over other composite-type liners.

Figure 7:
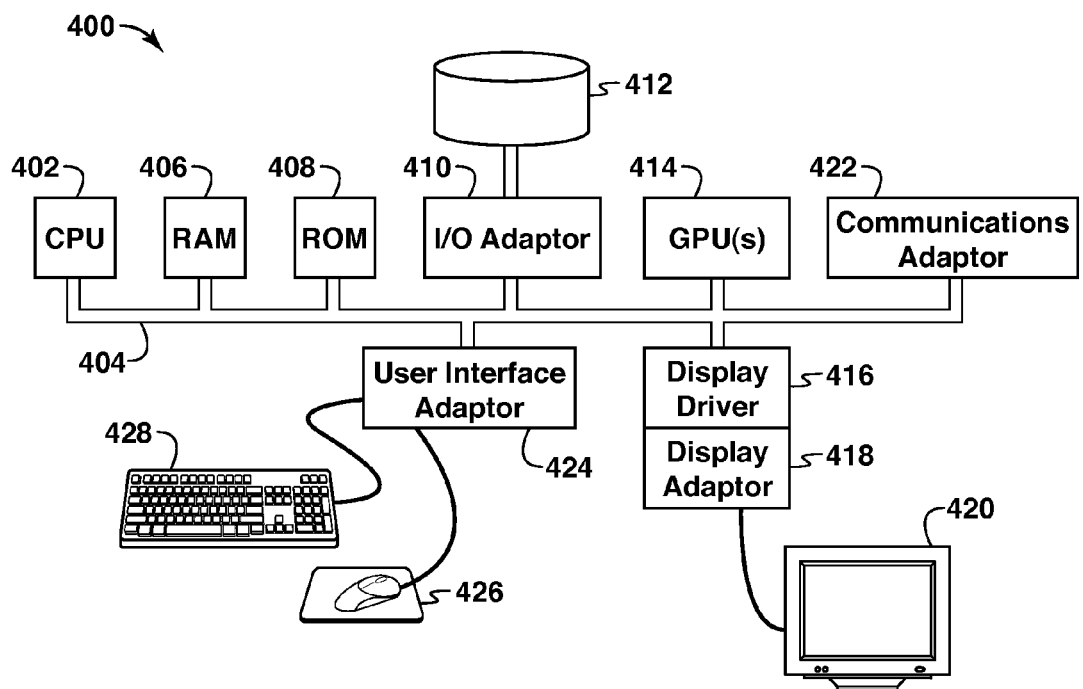
FIG. 7 is a block diagram of a computer system.

FIG. 7 is a block diagram of a computer system 400 that can be used to execute an embodiment of the present techniques. A central processing unit (CPU) 402 is coupled to system bus 404. The CPU 402 may be any general-purpose CPU, although other types of architectures of CPU 402 (or other components of exemplary system 400) may be used as long as CPU 402 (and other components of system 400) supports the operations as described herein. Those of ordinary skill in the art will appreciate that, while only a single CPU 402 is shown in FIG. 7, additional CPUs may be present. Moreover, the computer system 400 may comprise a networked, multi-processor computer system that may include a hybrid parallel CPU 402/GPU 414 system, The CPU 402 may execute the various logical instructions according to various embodiments. For example, the CPU 402 may execute machine-level instructions for performing processing according to the operational flow described.

The computer system 400 may also include computer components such as non-transitory, computer-readable media. Examples of computer-readable media include a random access memory (RAM) 406, which may be SRAM, DRAM, SDRAM, or the like. The computer system 400 may also include additional non-transitory, computer-readable media such as a read-only memory (ROM) 408, which may be PROM, EPROM, EEPROM, or the like. RAM 406 and ROM 408 hold user and system data and programs, as is known in the art. The computer system 400 may also include an input/output (I/O) adapter 410, a communications adapter 422, a user interface adapter 424, a display driver 416, and a display adapter 418.

The I/O adapter 410 may connect additional non-transitory, computer-readable media such as a storage device(s) 412, including, for example, a hard drive, a compact disc (CD) drive, a floppy disk drive, a tape drive, and the like to computer system 400. The storage device(s) may be used when RAM 406 is insufficient for the memory requirements associated with storing data for operations of embodiments of the present techniques. The data storage of the computer system 400 may be used for storing information and/or other data used or generated as disclosed herein. For example, storage device(s) 412 may be used to store configuration information or additional plug-ins in accordance with an embodiment of the present techniques. Further, user interface adapter 424 couples user input devices, such as a keyboard 428, a pointing device 426 and/or output devices to the computer system 400. The display adapter 418 is driven by the CPU 402 to control the display on a display device 420 to, for example, present information to the user regarding available plug-ins.

The architecture of system 400 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable hardware structures capable of executing logical operations according to the embodiments. The term "processing circuit" includes a hardware processor (such as those found in the hardware devices noted above), ASICs, and VLSI circuits. In an embodiment, input data to the computer system 400 may include various plug-ins and library files. Input data may additionally include configuration information.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. An apparatus comprising:
   a tubular suction pile;
   an indenter housing that surrounds the tubular suction pile, wherein the indenter housing is configured to be sunk into a seabed in response to a negative pressure created from water being removed from the tubular suction pile, and the indenter housing is configured to create a trench in the seabed; and
   a water jetting device, within the indenter housing, that includes a first valve, a nozzle, and
   a channel that connects the first valve to the nozzle.

2. The apparatus of claim 1, wherein the indenter housing is a wedge shaped body.

3. The apparatus of claim 1, wherein the water jetting device is configured to expel water from the nozzle without using a pump device.

4. The apparatus of claim 2, wherein the wedge shaped body has a trapezoidal cross-section.

5. The apparatus of claim 4, wherein the nozzle is disposed on tapered section of the trapezoidal cross-section.

6. The apparatus of claim 1, wherein the water jetting device is disposed in a leading portion of the indenter housing.

7. The apparatus of claim 2, wherein the wedge shaped body is directly connected to the tubular suction pile.

8. The apparatus of claim 1, further comprising:
   a vibration device,
   wherein the vibration device is configured to impart a longitudinal vibration to the indenter housing that sinks the indenter housing into the seabed.

9. The apparatus of claim 1, further comprising:
   a second valve connected to the tubular suction pile, wherein the second valve is configured to
   allow water to be pumped out of the tubular suction pile.

10. An apparatus comprising:
    a vibration device; and
    an indenter housing that surrounds the vibration device, wherein the vibration device is configured to impart a longitudinal vibration to the indenter housing in a direction substantially perpendicular to a seabed, and the indenter housing is configured to be sunk into the seabed in response to the longitudinal vibration and is configured to create a trench in the seabed.

11. The apparatus of claim 10, wherein the indenter housing is a wedge shaped body.

12. The apparatus of claim 11, wherein the wedge shaped body has a trapezoidal cross-section.

13. The apparatus of claim 11, wherein the wedge shaped body is directly connected to the vibration device.

14. The apparatus of claim 10, wherein the vibration device includes a hydraulic system.

15. A method comprising:
    lowering or dropping an indenter into a body of water, wherein the indenter includes
    a tubular suction pile,
    a housing that surrounds the tubular suction pile, and
    a water jetting device, within the housing, that includes a first valve, a nozzle, and
    a channel that connects the first valve to the nozzle;
    sinking the indenter into a seabed after the indenter comes to rest at a bottom of the seabed, the sinking including creating a negative pressure by removing water from the tubular suction pile, wherein the negative pressure causes the indenter to sink to a predetermined depth in the seabed;
    causing water to exit from the indenter, the water loosening soil in the seabed; and
    creating a trench in the seabed by pulling or pushing the indenter after the indenter is sunk into the seabed and the soil is loosened by the water.

16. The method of claim 15, further comprising:
    laying a pipeline in the trench.

17. The method of claim 15, further comprising:
    using a computer to control the negative pressure in order to cause the indenter to sink to the predetermined depth in the seabed.

18. A method comprising:
    lowering or dropping an indenter into a body of water, wherein the indenter includes
    a vibration device, and
    a housing that surrounds the vibration device;
    causing the vibration device to impart a longitudinal vibration to the housing, the longitudinal vibration induced in a direction substantially perpendicular to a seabed and causing the housing to sink to a predetermined depth in the seabed; and
    creating a trench in the seabed by pulling or pushing the indenter after the indenter is sunk into the seabed.

19. The method of claim 18, further comprising causing the vibration device to impart a longitudinal vibration while the creating the trench step is performed.

20. The method of claim 18, further comprising:
    using a computer to control the vibration device in order to cause the indenter to sink to the predetermined depth in the seabed.

* * * * *